United States Patent [19]

Fukuda et al.

[11] Patent Number: 5,049,741
[45] Date of Patent: Sep. 17, 1991

[54] ELECTROMAGNETIC WAVE SHIELDING SYSTEM FOR OPTICAL SENSOR HAVING AN APERTURE

[75] Inventors: Minoru Fukuda, Tokyo; Shinichiro Ichikawa, Matsudo, both of Japan

[73] Assignee: National Space Development Agency of Japan, Tokyo, Japan

[21] Appl. No.: 498,064

[22] Filed: Mar. 23, 1990

[30] Foreign Application Priority Data

May 2, 1989 [JP] Japan .................................. 1-112116

[51] Int. Cl.$^5$ ............................. H01J 5/02; H01J 3/14
[52] U.S. Cl. .................................... 250/239; 250/216; 250/237 R
[58] Field of Search ................. 356/225; 350/448, 449, 350/450; 250/237 R, 203.1, 216, 239

[56] References Cited

U.S. PATENT DOCUMENTS

| | | | |
|---|---|---|---|
| 3,090,831 | 5/1963 | Schepler | 350/450 |
| 3,448,274 | 6/1969 | Altman | 250/237 R |
| 3,827,806 | 8/1974 | Skagerlund | 356/4 |
| 3,936,149 | 2/1976 | Imai | 350/449 |
| 4,015,897 | 4/1977 | Konoma et al. | 350/450 |
| 4,040,751 | 8/1977 | Baker et al. | 250/237 R |
| 4,708,444 | 11/1987 | Tsuji | 350/450 |
| 4,948,969 | 8/1990 | Yokota | 250/216 |

Primary Examiner—David C. Nelms
Assistant Examiner—Michael Messinger
Attorney, Agent, or Firm—Armstrong, Nikaido, Marmelstein, Kubovcik, & Murray

[57] ABSTRACT

An electromagnetic wave shielding system for an optical sensor includes: a sensor body having an aperture through which an optical signal is made incident on the sensor body; a shielding plate disposed within the sensor body, the shielding plate having an opening having a dimension of at most about one-half of the wavelength of electromagnetic waves; an optical system for gathering the optical signal which passes through the aperture of the sensor body to the dimension of the opening in the shielding plate so that it can pass through the opening; and a detecting/processing unit for detecting and processing the optical signal which passes through the opening in the shielding plate. Thus, the electromagnetic waves which have entered are prevented from passing through or are remarkably attenuated by the opening in the shielding plate, and are thereby prevented from reaching the detecting/processing unit.

4 Claims, 1 Drawing Sheet

ELECTROMAGNETIC WAVE SHIELDING SYSTEM FOR OPTICAL SENSOR HAVING AN APERTURE

BACKGROUND OF THE INVENTION

1. Field of the Invention

The present invention relates to an electromagnetic wave shielding system for an optical sensor having an aperture which is capable of preventing electromagnetic waves from entering and interfering with a signal processing unit.

2. Description of the Related Art

Optical sensors for converting an optical signal into an electrical signal and for electrically processing, e.g., amplifying, the electrical signal are known. Such optical sensors have an optical aperture through which an optical signal passes whereby it is made incident on the sensor. However, the aperture of the optical sensors also allows the passage of electromagnetic waves. In consequence, electromagnetic waves may enter the sensor and interfere with an electrical signal processing unit disposed within the optical sensor.

Optical sensors may be installed in an an artificial satellite in the vicinity of a source of generating electromagnetic waves at a high level. Such optical sensors detect a very weak optical signal, converts the detected optical signal into an electrical signal, and amplifies the electrical signal in a wide range. In that case, a problem involving the interference of electromagnetic waves with the signal processing unit disposed within the sensor often arises.

Conventionally, such an interference of the electromagnetic waves with the signal processing unit is prevented in the manner described below: a conductive film is coated on the surface of the lens which constitutes an optical system for the optical sensor so as to attenuate the electromagnetic waves. Alternatively, a shielding plate is disposed between the optical sensor and the electromagnetic wave generating source so as to prevent the electromagnetic waves from entering the interior of the sensor.

However, in the former case in which a conductive film is coated on the surface of the lens of the optical system, the conductive film must be thickly coated in order to achieve effective attenuation of the electromagnetic waves. However, the thick coating reduces the transmittance of the optical system with respect to an optical signal to be detected, thereby reducing the performance of the optical sensor.

In the latter case where the shielding plate is disposed between the optical sensor and the electromagnetic wave generating source, design of the shielding plate is based on an ad hoc decision, and it is therefore difficult to dispose the shielding plate in such a manner that it does not block the visual field of the optical sensor. Furthermore, a large shielding plate increases the overall weight of the sensor.

SUMMARY OF THE INVENTION

An object of the present invention is to provide an electromagnetic wave shielding system for an optical sensor having an aperture which eliminates the aforementioned problems arising with respect to the conventional electromagnetic wave interference prevention means for an optical sensor.

Another object of the present invention is to provide an electromagnetic shielding system for an optical sensor having an aperture which is capable of effectively preventing passage of only the electromagnetic waves without reducing the transmittance relative to an optical signal incident on the optical sensor.

Another object of the present invention is to provide an electromagnetic wave shielding system for an optical sensor having an aperture which is light-weight and which has a simple configuration.

To this end, the present invention provides an electromagnetic wave shielding system for an optical sensor which comprises: a sensor body having an aperture through which an optical signal is made incident on the sensor body; a shielding plate disposed within the sensor body, the shielding plate having an opening having a dimension of at most about one-half of the wavelength of electromagnetic waves; an optical system for gathering the optical signal which passes through the aperture of the sensor body to the dimension of the opening in the shielding plate so that it can pass through the opening; and a detecting/processing unit for detecting and processing the optical signal which passes through the opening in the shielding plate.

In the present invention, the optical signal which passes through the aperture of the sensor body and is made incident on the sensor is gathered by the optical system, and the gathered optical signal passes through the opening in the shielding plate and then reaches the detecting/processing unit without being attenuated where it is detected and processed. The electromagnetic waves which enter through the aperture of the sensor body are remarkably attenuated during the passage through the opening in the shielding plate having a dimension of at most about one-half of the wavelength thereof, and are thereby effectively prevented from reaching and interfering with the detecting/processing unit in the sensor body.

DETAILED DESCRIPTION OF THE PREFERRED EMBODIMENTS

Figure 1:
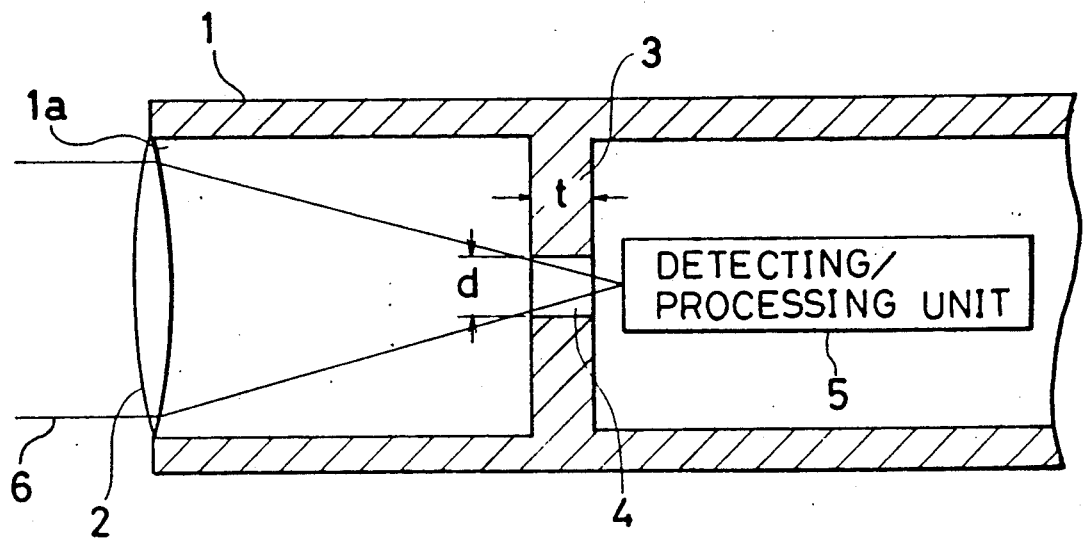
FIG. 1 is a cross-sectional view of an electromagnetic wave shielding system for optical sensor having an aperture, showing a first embodiment of the present invention.

A first embodiment of an electromagnetic shielding system for an optical sensor having an aperture according to the present invention will be described below with reference to FIG. 1. In FIG. 1, a cylindrical optical sensor body 1 formed of a conductor has an aperture 1a where an objective lens 2 is disposed. A shielding plate 3 made of a conductor is integrally formed with the body 1 as if it closes the body 1. The potential of the shielding plate 3 is maintained at the same value as that of the body 1.

The shielding plate 3 has an opening 4 having a dimension d which is at most about one-half of the wavelength $\lambda$ of the electromagnetic waves to be prevented from entering the interior of the optical sensor. The shielding plate 3 has a thickness t which is $n\lambda$ ($n=1, 2, \ldots$).

The parameters of the objective lens 2 are set such that the objective lens 2 gathers an optical signal 6 incident thereon to such a degree that it can pass through the opening 4 formed in the shielding plate 3. At the focal point of the objective lens 2 is disposed a signal detection/processing unit 5 for detecting and processing, e.g., amplifying, an optical signal.

In the optical sensor which is protected from electromagnetic waves in the manner described above, the incident optical signal 6 is gathered by the objective lens 2, and the gathered optical signal passes through the opening 4 formed in the shielding plate 3 and reaches the detecting/processing unit 5 without being attenuated. In the detecting/processing unit 5, the optical signal is converted into an electrical signal, and various processing, including amplification, are conducted on the resultant electrical signal.

Electromagnetic waves also pass through the objective lens 2 and enter the sensor body 1. However, since the opening 4 of the shielding plate 3 has the dimension d which is at most about one-half of the wavelength $\lambda$ thereof, the electromagnetic waves are remarkably attenuated by about n x 30 db during the passage through the opening 4. Hence, it is possible to sufficiently reduce the strength of the electromagnetic waves which reach the detecting/processing unit 5 disposed within the sensor body and thereby efficiently prevent the electromagnetic waves from interfering with the detecting/processing unit 5 by adequately setting the thickness t ($=n\lambda$) of the shielding plate 3.

Figure 2:
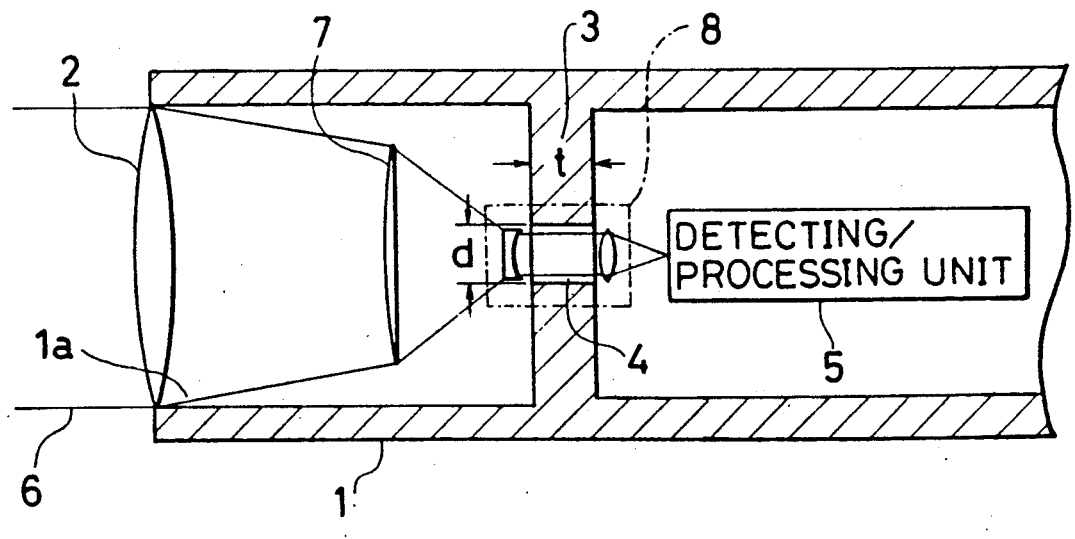
FIG. 2 is a cross-sectional view of a second embodiment of the present invention.

A second embodiment of the present invention will now be described below with reference to FIG. 2. The same reference numerals are used to denote parts which are the same as those of the first embodiment shown in FIG. 1. This embodiment is devised in order to cope with the case where the optical signal 6 cannot be gathered by the objective lens 2 to such a degree that it can pass through the opening 4 in the shielding plate 3 which has the dimension d of about $\frac{1}{2} \lambda$. More specifically, a focusing lens 7 is disposed at the rear of the objective lens 2, and the optical signal which has passed through the objective lens 2 is further gathered by the focusing lens 7 so that it can pass through the opening 4 in the shielding plate 3 having the dimension d of about $\frac{1}{2} \lambda$.

When the focusing lens 7 is disposed in the manner described above, it may be impossible to set the thickness t of the shielding plate 3 to a desired value. In that case, a correction lens system 8 such as that shown in FIG. 2 may be disposed in the vicinity of the opening 4 in the shielding plate 3, and the optical signal which has passed through the focusing lens 7 is converted into parallel rays of light. The parallel rays of light pass through the opening 4 in the shielding plate 3, and are then further gathered before being made incident on the detecting/processing unit 5.

In this embodiment, the optical signal 6 incident on the sensor is gathered by the objective lens 2 and the focusing lens 7, and the gathered optical signal passes through the opening 4 in the shielding plate 3 by means of the correction lens system 8 and then reaches the detecting/processing unit 5 without being attenuated, as in the case of the first embodiment.

Electromagnetic waves also pass through the objective lens 2 and the focusing lens 7 and enter the sensor body. However, they are prevented form passing through or are remarkably attenuated by the opening 4 in the shielding plate 3, as in the case of the first embodiment, and are thus efficiently prevented from reaching the detecting/processing unit 5 provided in the senor body.

The shape of the opening 4 formed in the shielding plate 3 is not limited to a circular form but it may have any form, e.g., a square form as long as the form is not a complicated one. Efficient electromagnetic waves shielding effect is obtained when the opening has a dimension of about $\frac{1}{2}\lambda$ at most.

What is claimed is:

1. An electromagnetic shielding system for use in an optical sensor system, for shielding a signal detecting and processing means thereof from electromagnetic radiation with a wavelength greater than the wavelength of light, said shielding system comprising:

an electronically conducting sensor housing having an aperture through which an optical signal is made incident on said detecting and processing means;

a conducting shielding plate disposed within said sensor housing, said shielding plate having an opening having a dimension of one-half or less of the wavelength of the electromagnetic radiation to be suppressed; and an optical system for focusing the optical signal which passes through said aperture of said housing such that said optical signal passes through said opening in said shielding plate;

wherein said detecting and processing means of the optical sensor system is positioned in said housing for detecting and processing the optical signal which passes through said opening in said shielding plate.

2. An electromagnetic shielding system for an optical sensor system according to claim 1, wherein said conducting shielding plate has a thickness which is $n\lambda$ wherein n is an integer and wherein $\lambda$ is the wavelength of the electromagnetic waves to be suppressed.

3. An electromagnetic shielding system for an optical sensor system according to claim 1, wherein said optical system comprises an objective lens which is positioned at said aperture of said sensor housing.

4. An electromagnetic shielding system for an optical sensor system according to claim 1, wherein said optical system comprises at least four lenses, a first objective lens disposed at said aperture of said sensor housing, a second focusing lens disposed between said first lens and said shield plate, a third diverging lens disposed at the entrance of said opening in the shielding plate for directing light through said opening substantially parallel to the opening axis, and a fourth focusing lens disposed between said shielding plate and said detecting and processing means.

* * * * *